Nov. 21, 1961    S. K. LEHMAN    3,009,478
FLUID VALVE STRUCTURES
Filed Sept. 12, 1955    4 Sheets-Sheet 3
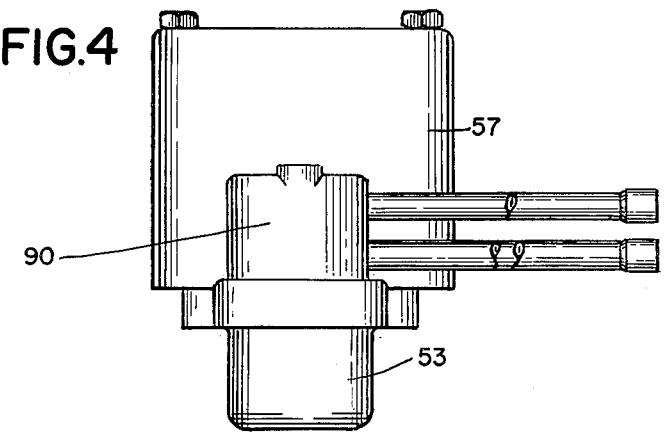
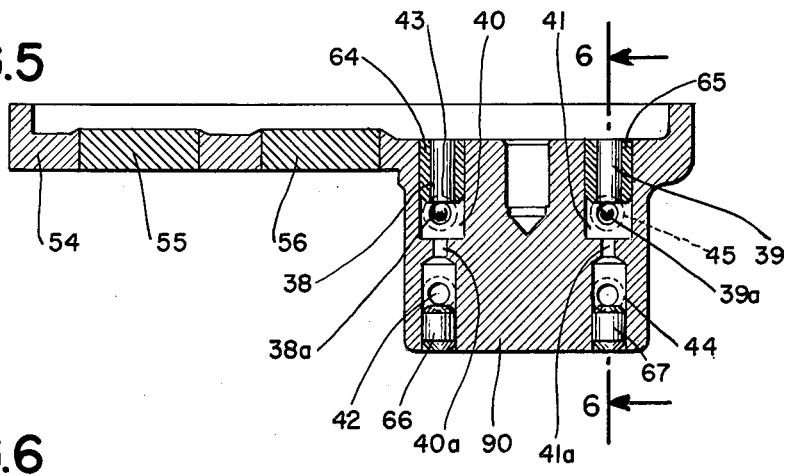
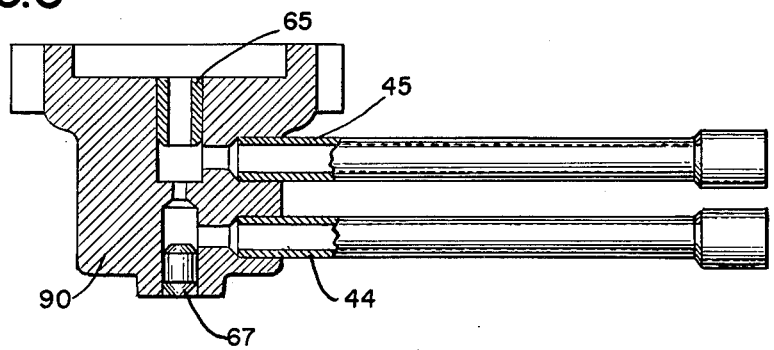
INVENTOR
SAMUEL K. LEHMAN
Kenyon & Kenyon
ATTORNEYS

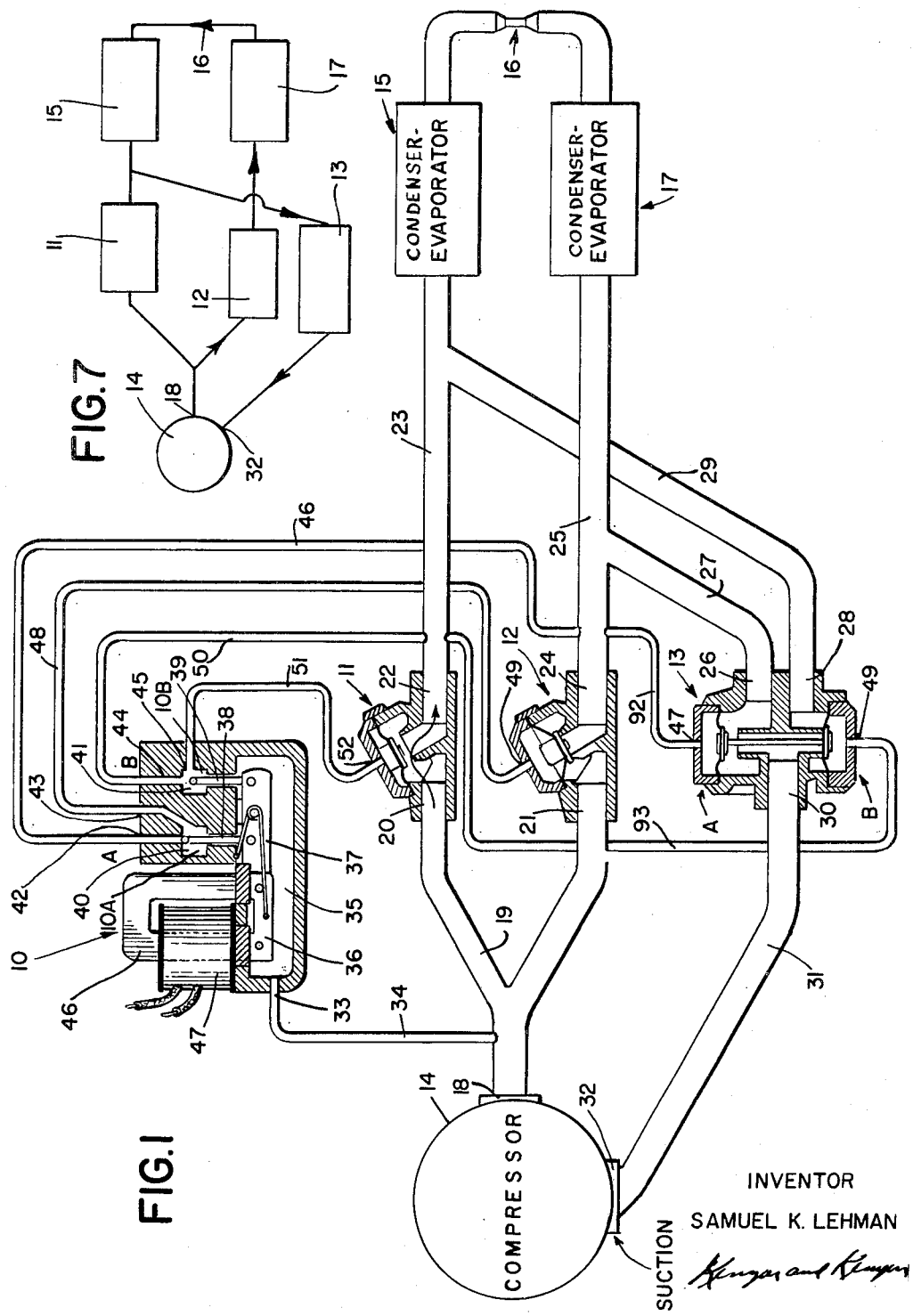
Nov. 21, 1961  S. K. LEHMAN  3,009,478
FLUID VALVE STRUCTURES
Filed Sept. 12, 1955  4 Sheets-Sheet 1
INVENTOR
SAMUEL K. LEHMAN
ATTORNEYS

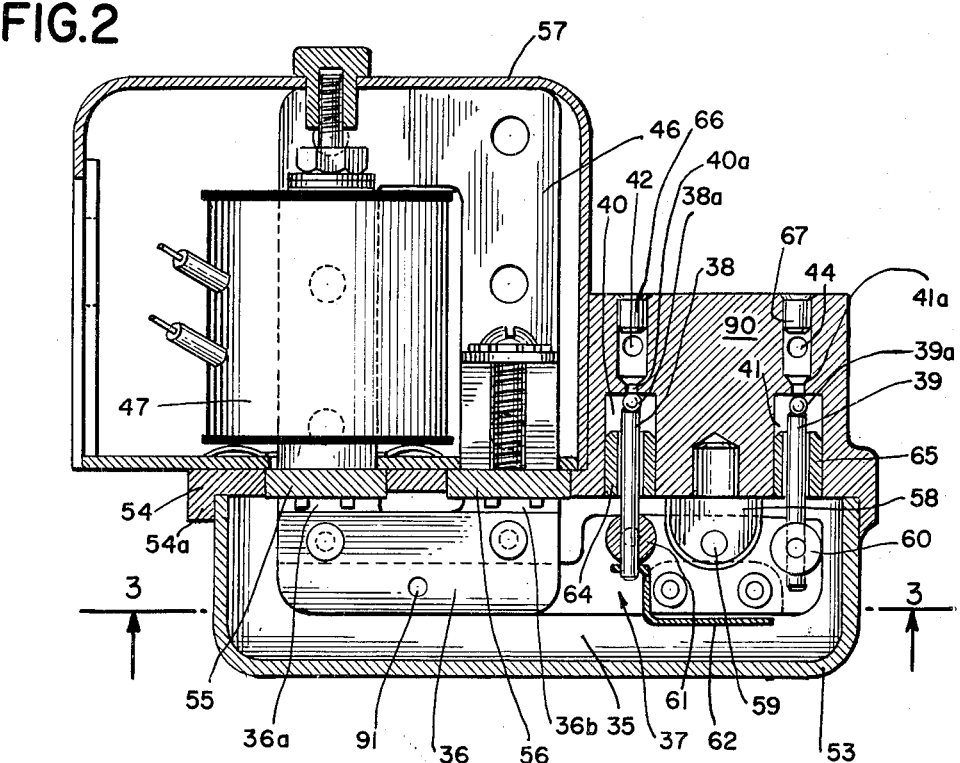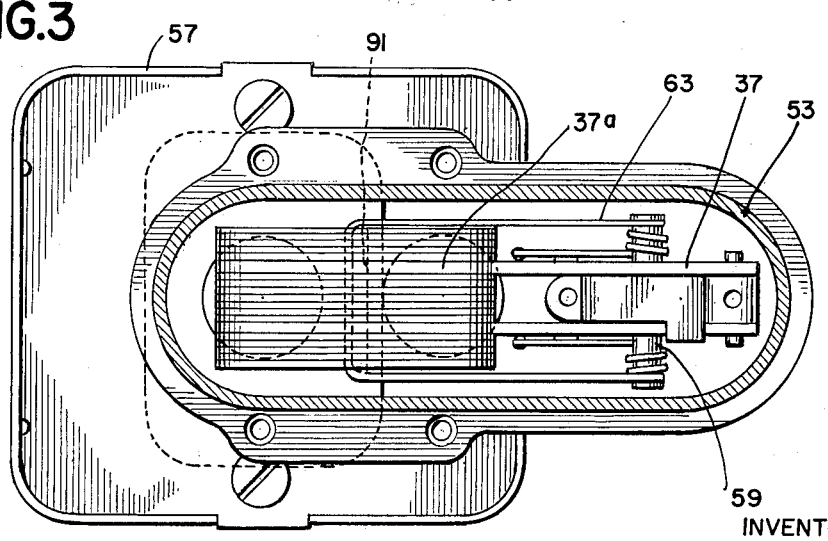

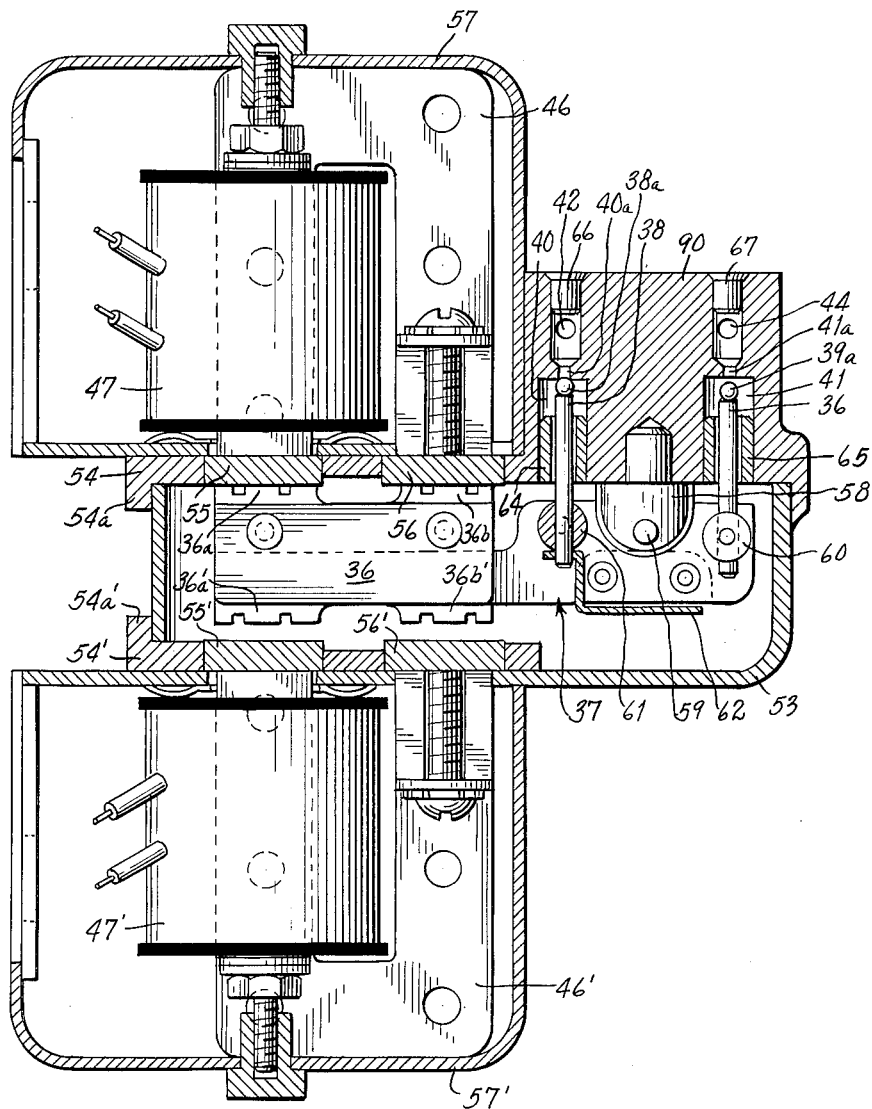

United States Patent Office 3,009,478
Patented Nov. 21, 1961

3,009,478
FLUID VALVE STRUCTURES
Samuel K. Lehman, 5015 15th Ave., Brooklyn, N.Y.
Filed Sept. 12, 1955, Ser. No. 533,871
8 Claims. (Cl. 137—609)

The present invention relates generally to valve mechanisms, and more particularly to a fluid control system wherein one solenoid pilot valve assembly is adapted remotely to govern the operation of a plurality of diaphragm valves.

Complex fluid control systems usually entail a plurality of valves which must be individually and selectively actuated to effect the desired control functions in the various fluid lines forming the system. Thus, in a reverse cycle system wherein a refrigeration unit may serve as a cooling mechanism in the summer and a heat source in the winter, an arrangement of valves is adapted to interchange the operation of the condenser and evaporator in the refrigerant circuit. While it is possible to actuate each valve separately, as a practical matter in industrial and household installations one must provide a common control device coupled to the several valves to effect the desired interchange in a single switching operation. This may be accomplished, for example, by installing solenoid actuated valves throughout the system and providing a common control circuit for the several solenoids. However, an arrangement of this type is relatively expensive and adds substantially to the overall size and cost of the unit. Attempts have also been made to combine the fluid control valves and the pilot valves in a unitary assembly, but such devices do not provide adequate separation of hot and cold lines.

Accordingly, it is the principal object of the invention to provide a fluid control system wherein a single solenoid valve assembly is adapted to govern the operation of a plurality of diaphragm valves remotely disposed with respect to said solenoid valve. A significant feature of the invention resides in the fact that when incorporated in a reverse cycle system, it is possible to effect a rapid and positive interchange in the operation of the condenser and evaporator merely by energizing and de-energizing the solenoid valve. Thus the system lends itself readily to household installations whereby the user, simply by pressing a switching button, can convert immediately from cooling to heating or from heating to cooling, as desired.

A more specific object of the invention is to provide an improved solenoid valve construction wherein the electromagnet is isolated from the fluid chamber and yet is magnetically coupled to a valve-acttuating armature which is disposed within said fluid chamber.

Another object of the invention is to provide a solenoid pilot valve assembly having a multiple valve construction adapted selectively to supply pilot pressure to a plurality of pressure-responsive diaphragm-disc valves. An important feature of this assembly is that the multiple valves are self-cleaning and reliable in operation.

A further object of the invention is to provide a diaphragm-disc valve structure wherein when the valve is either open or closed pressure on the diaphragm is substantially relieved.

Still another object of the invention is to provide improved diaphragm single valve and double valve shuttle structures of simple, sturdy and efficient design, which valve structures may be manufactured at low cost.

For a better understanding of the invention as well as other objects and further features thereof, reference is had to the following detailed description to be read in connection with the accompanying drawing, wherein like components in the several views are identified by like reference numerals.

In the drawing:

FIGURE 1 is a schematic diagram of a reverse cycle system incorporating valve structures in accordance with the invention.

FIGURE 2 is a longitudinal section taken through a solenoid pilot valve assembly in accordance with the invention.

FIGURE 3 is a section taken along lines 3—3 in FIG. 2 showing the armature and stem-actuating lever in plan view.

FIGURE 4 is a side view of the assembly.

FIGURE 5 is a separate view of the valve body of the solenoid assembly, shown in section.

FIGURE 6 is a section taken in the plane of lines 6—6 in FIG. 5.

FIGURE 7 is a schematic diagram of the flow circuit in the reverse cycle.

FIGURE 8 is a view similar to FIG. 2 but showing a modification.

Referring now to the drawings, and more particularly to the schematic diagram in FIG. 1, a reverse cycle vapor compression system is shown including a plurality of valves in accordance with the invention, the solenoid pilot valve assembly being generally designated by reference numeral 10, the two diaphragm-disc valves by numerals 11 and 12 and the diaphragm shuttle valve by numeral 13.

The refrigerant, which is a volatile liquid, such as Freon, is raised in pressure by a compressor 14 of any conventional type, such as a rotary or centrifugal mechanism. The system further includes a condenser-evaporator, which may be of the shell and tube type, in which during the refrigerating cycle heat is removed from the compressed refrigerant, causing it to condense to a liquid. A restricted capillary tube 16 is provided which serves as an expansion means and regulates the flow of the refrigerant into a condenser-evaporator 17 of any suitable design, the device 17 serving as an evaporator during the refrigerating cycle.

The outlet or discharge port 18 of the compressor 14 is coupled through a forked pipe 19 to both the input port 20 of diaphragm-disc valve 11 and the input port 21 of diaphragm valve 12. The output port 22 of valve 11 is connected through a pipe 23 to the inlet of condenser 15. Devices 15 and 17 are intercoupled by the capillary tube 16. The output port 24 of valve 12 is connected through pipe 25 to the inlet of device 17. Shuttle valve 13 has two alternately operating valve sections A and B and is provided with a first input port 26, section A, coupled by branch pipe 27 to pipe 25, and a second input port 28 for section B, coupled by branch pipe 29 to pipe 23. Shuttle valve 13 further includes a common output port 30 connected by pipe 31 to the inlet or suction port 32 of the compressor.

The solenoid valve assembly 10 is provided with a fluid input port 33 connected by a tube 34 to the forked pipe 19. The fluid supplied through tube 34 is fed into an armature chamber 35, wherein an armature 36 is mounted on a lever extension of a rocker arm 37 supporting valve stems 38 and 39 which are reciprocable in opposing directions within valve chambers 40 and 41, respectively, of a pair of control valves 10A and 10B formed in the valve body.

The fluid from the armature chamber 35 flows into said valve chambers through the annular region surrounding the stems 38 and 39. The valve chamber of valve 10A is provided with a pair of pilot ports 42 and 43, and the valve chamber of valve 10B is similarly provided with a pair of pilot ports 44 and 45. Ports 42 and 44 are provided with seats which cooperate with stems 38 and 39, respectively, to effect a valve action. An electromagnet including a U-shaped core 46 and a solenoid 47 is mounted above the armature chamber in cooperative relation with armature 6. A more detailed description of the solenoid valve assembly will be later set forth in connection with FIGS. 2 to 6.

The structure of the solenoid valve is such that when the electromagnet is energized and the armature attracted in the direction of the core, the rocker arm 37 thrusts stem 38 into the valve chamber 40 of valve A to close port 42, while retracting stem 39 thereby to open port 44 in the valve chamber of valve B. Ports 43 and 45 remain open under any operating condition.

When the electromagnet is deenergized, the spring bias on the rocker arm 37 is such as to reverse the relative positions of valve stems 38 and 39, whereby the passage to port 42 is opened and that to port 44 is blocked, the ports 43 and 45 remaining unblocked. The fluid passage through stems 38 and 39 is small relative to the passages through the seats of the associated ports, whereby fluid will flow through the seats at a greater rate than through the stem passages.

Port 42 on the solenoid valve is coupled by a tube 46 to pipe 25, which pipe is also connected via tube 92 to the upper control port 47 of shuttle valve 13. Port 43 of the solenoid valve is connected by tube 48 to the control port 49 of valve 11. Port 44 is connected by tube 50 to pipe 23, which pipe is also connected via tube 93 to the lower control port 49 of shuttle valve 13. Port 45 is connected by a tube 51 to control port 52 of valve 11.

*Refrigeration operation*

We shall now describe the interchange operation of the valve system, consideration being first given to the fluid circuit which is established when the solenoid valve assembly 10 is energized to provide refrigeration.

In this condition, which is that shown in FIG. 1, valve stem 38 blocks the seat in pilot port 42 on control valve 10A, hence pressurized fluid from the compressor entering the solenoid valve 10 through armature chamber 35 and flowing through valve chamber 40 passes through tube 48 into the control chamber of valve 12 above the diaphragm therein. Accordingly, the control chamber of valve 12 fills with fluid and the disc is forced downwardly against the seat to shut the valve.

As to valve 11, since valve stem 39 of valve 10B is retracted to open port 44, a pressure relief path is formed between the control chamber above the diaphragm of valve 11 and the downstream pipe 23. This relief path is through tube 51, port 44, chamber 41, port 45 and tube 50. Since fluid will flow out through the ports 44 and 45 at a greater rate than it will flow into chamber 41 through the passage surrounding stem 39, pressure cannot build up in the diaphragm chamber of valve 11 as long as stem 39 is retracted. Consequently, the pressure differential which exists between the input and output ports of valve 11 forces the diaphragm therein upwardly to open the valve.

With valve 11 open and valve 12 shut, the resultant pressure conditions in the system causes the upper section A of shuttle valve 13 to open and the lower section B to close. It will be noted that the control port 47 of the upper section 13A is coupled to the pipe 25 leading from valve 12 and that the input port 26 of valve section 13A is connected to the same pipe but at a lower point downstream. Similarly, control port 49 of the lower section 13B is coupled to the pipe 23 leading from valve 11 and the input port 28 of valve section 13B is also coupled to pipe 23 but at a lower point downstream. Hence, when valve 12 is closed and valve 11 is open, the pressure conditions in the system are such as to open section A of valve 13 and simultaneously to close section B.

With the valves adjusted in this manner, the flow of liquid is in the following path: The refrigerant, which is compressed in compressor 14, passes through valve 11 into condenser 15, wherein heat is removed from the compressed refrigerant, causing it to condense to a liquid. Liquid from condenser 15 flows through capillary tube 16 into evaporator 17 where the liquid is converted to vapor by absorption of heat from the space to be cooled. From the evaporator 17 the refrigerant, as approximately saturated vapor, flows through the upper section 13A of the shuttle valve to the compressor 14 for reuse.

*Heat pump operation*

We shall now consider the reverse operation of the system which is effected by de-energizing the solenoid valve. In this condition pilot port 42 of valve A is unblocked, whereas pilot port 44 is blocked by upward movement of stem 39. Thus pressure builds up in the diaphragm chamber of valve 11 and is relieved in that of valve 12, whereby valve 11 is closed and valve 12 is opened. Shuttle valve 13 is caused to reverse, whereby the upper section A is closed and the lower section B is opened.

In the fluid circuit established by de-energization of solenoid valve 10, as shown in FIG. 7, the compressed fluid is fed through valve 12 into the device 17 acting as a condenser, the output of the condenser being coupled through the capillary tube 16 into the device 15 acting as an evaporator, whose output flows through the lower section B of shuttle valve 13 back into the compressor. In the heat pump system the refrigerant gains heat in the evaporation from the surroundings, which may be at a relatively low temperature. The heat gained as well as the heat of compression are again dissipated at the condenser, but this heat is conveyed to the space to be heated.

*The solenoid valve assembly*

We shall now consider in greater detail the structure of the solenoid valve assembly 10. Referring to FIGS. 2 to 6, the armature chamber 35 into which fluid from the compressor 14 is supplied (note FIG. 1) is defined by a cover 53 which encloses the underside of a base member 54. Base member 54 is formed of non-magnetic material, such as brass, and is provided with a peripheral flange 54a which surrounds the mouth of cover 53 and is sealed thereto by brazing or the like. Integral with base 54 adjacent one end thereof is an upwardly projecting block 90 which forms the body of the valve.

Mounted upright above base member 54 and adjacent the valve body 90 is the U-shaped laminated electromagnet core 46. The pole faces of the core 46 abut the upper surfaces of discs 55 and 56 which are formed of magnetic material such as nickel-iron or steel and are tightly set into apertures in the base 54, as by brazing, to form a magnetic flux path between the pole faces and the armature 36 within the chamber 35. Thus the solenoid 47, which surrounds one leg of core 46, is isolated from the fluid in chamber 35 and yet it is possible to exert magnetic attraction on the armature. The solenoid is enclosed by a nonmagnetic cover 57.

Armature 36 has a generally rectangular shape and is formed by laminations which are riveted together, the armature having projecting end portions or shoes 36a and 36b which are grooved to accommodate the usual shading coils. The shoes 36a and 36b are attracted to discs 55 and 56 when the valve is energized.

The rocker arm 37, as best seen in FIG. 3, is constituted by a pair of spaced plates which are pivotally supported in a bearing bracket 58, depending from the underside of the valve block 90, the rocker arm being rotatable about a pivot pin 59 supported in the bracket. The valve stems 38 and 39 are mounted in and extend upwardly from studs 60 and 61 which are rotatably mounted at spaced positions between the plates of the rocker arm 37. To ensure proper seating of the stems as the rocker arm is swung and to compensate for wear, a take-up spring, such as spring 62 in FIG. 2, is coupled to the lower end of each stem.

Armature 36 is pivotally supported by means of a pin 91 on levers 37a extending longitudinally from the rocker arm plates 37 and integral therewith. Torsion springs 63 are wound about either end of pivot pin 59 and extend between the armature 36 and the underside of base member 54 to provide a tension normally urging the armature away from the magnetic discs 55 and 56.

As best seen in FIGS. 5 and 6, each of the valve chambers 40 and 41 is constituted by an upper and lower cylindrical section, the upper section being of relatively small diameter and being coupled through still smaller tubular bores 40a and 41a to the lower section. Port 42 communicates with the upper section of chamber 40 and port 43 with the lower. Port 44 communicates with the upper section of chamber 41 and port 45 with the lower. The upper sections are enclosed by plugs 66 and 67. The stems 38 and 39 are slideable within bushings 64 and 65 inserted in the lower sections of the valve chamber, the internal diameter of each bushing being slightly greater than that of the stems to provide an annular fluid passage therebetween to admit fluid into the valve chambers. The stems may also be longitudinally knurled to provide fluid passages.

Stems 38 and 39 have affixed to their upper ends steel balls 38a and 39a which, when the individual stem is raised, are seated against the entrances to the bore 40a and 41a connecting the upper section to the lower section, thereby blocking the upper section. In this manner either port 42 or 44 is blocked, depending upon which of the stems is projected upwardly.

When the solenoid is energized, the armature 36 is drawn against the underside of base 54, thereby swinging the rocker arm simultaneously to retract stem 39 and to raise stem 38, as shown in FIG. 2. When the armature is released, the springs 63 swing the rocker arm 37 in the other direction to reverse the stem positions. The valve assembly may of course include more than two valve chambers and cooperating stems to provide more complex valve actions.

While the solenoid valve 10 has been shown as of the single acting type including a spring to return the armature to its initial condition upon deenergization of the electromagnet, it is to be understood that the structure may be made double acting. This may be accomplished, as shown in FIG. 8, by the addition of a second electromagnetic structure on the opposite side, thereby obviating the need for a spring and making possible a positive valve action in either direction.

The above modification is shown by FIG. 8 wherein the parts of the second electromagnetic structure are numbered the same as the corresponding parts shown in FIG. 2 and previously described, the numbers being primed in FIG. 8 where applied to the second structure. The springs 63 are of course eliminated, energization of one or the other of the solenoids 47 and 47' controlling the valve action as desired.

It is also to be understood that the invention is by no means limited to use with reverse heat cycle systems. For example, the valve system disclosed herein may also be employed in an aircraft fueling system or in other systems in which gasoline or other hazardous chemicals are pumped through supply lines. Should a fault or break occur in the supply line, the system may be caused automatically to reverse so as to empty the lines and return the hazardous fluid to the source. This automatic reversal may be effected by means acting to interrupt the electrical circuit to the solenoid valve in response to a predetermined flow condition in the lines.

While there has been shown what are considered to be preferred embodiments of fluid valve structures, it will be appreciated that many changes and modifications may be made therein without departing from the essential spirit of the invention. It is intended therefore in the appended claims to cover all such changes and modifications as fall within the true scope of the invention.

What is claimed is:

1. In a solenoid pilot valve assembly, a non-magnetic enclosure defining an armature chamber provided with a fluid inlet, an electromagnet removably mounted on a wall of said enclosure and including a U-shaped core having a pair of spaced pole faces abutting said wall, a pair of correspondingly spaced magnetic inserts incorporated in said wall and hermetically sealed thereto, said inserts providing a flux path between said faces and said chamber, and an armature movably disposed within said chamber in operative relation to said inserts.

2. A solenoid pilot valve assembly comprising a non-magnetic base, a non-magnetic cover for the underside of said base defining an armature chamber and provided with a fluid inlet, an electromagnet removably mounted on the top side of said base and having a U-shaped core whose pole faces abut said base, a pair of magnetic inserts incorporated in said base and hermetically sealed thereto, said inserts providing a flux path between said pole faces and said armature chamber, a valve body above said base and including a valve chamber and a passage connecting said valve chamber to said armature chamber, an armature pivotally mounted within said armature chamber in operative relation to said insert, and a valve stem operatively coupled to said armature and extending through said passage into said valve chamber, said stem having dimensions relative to said passage defining a channel whereby fluid from said armature chamber may pass through said channel into said valve chamber.

3. A solenoid pilot valve assembly comprising a non-magnetic base, a non-magnetic cover for the underside of said base defining therewith an armature chamber provided with a fluid inlet, an electromagnet mounted on the top side of said base and having a U-shaped core whose pole faces abut said base, a pair of magnetic inserts in said base forming a fluid path for said pole faces, a valve body above said base adjacent said electro-magnet and including a pair of valve chambers and a separate passage between each chamber and said armature chamber, an armature disposed within said armature chamber and having a pair of shoes in operative relation to said inserts, a rocker arm pivotally mounted in said armature chamber and operatively coupled to said armature, a pair of valve stems pivotally connected to said arm at spaced positions thereon on either side of said pivot and extending through said passages into said valve chambers.

4. A solenoid pilot valve assembly comprising a non-magnetic base, a non-magnetic cover for the underside of said base defining therewith an armature chamber provided with a fluid inlet, an electromagnet mounted on the top side of said base and having a core whose pole face abuts said base, a magnetic insert in said base providing a flux path between said pole face and said armature chamber, a valve body above said base and including a valve chamber, first and second ports communicating therewith and a passage connecting said valve chamber and said armature chamber, an armature structure pivotally mounted within said armature chamber in operative relation to said insert, and a valve stem operatively coupled to said armature and extending through said passage into said valve chamber, said stem being adapted to block said second port upon actuation of said electromagnet, said stem having dimensions forming a fluid channel in said passage which is smaller than the fluid channel through said ports.

5. A solenoid pilot valve assembly comprising a non-magnetic base, a non-magnetic cover for the underside of said base defining therewith an armature chamber provided with a fluid inlet, an electromagnet mounted on the top side of said base and having a core whose pole face abuts said base, a magnetic insert incorporated in said base and hermetically sealed thereto, said insert providing a flux path betwen said pole face and said armature chamber, a valve body disposed above said base and including a valve chamber, first and second ports communicating therewith and a passage connecting said valve chamber and said armature chamber, an armature structure pivotally mounted within said armature chamber in operative relation to said insert, and a valve stem operatively coupled to said armature and extending through said passage into said valve chamber, said stem being adapted to block said second port upon actuation of said electro-magnet, said stem having dimensions forming a fluid channel in said passage which is smaller than the fluid channel through said ports, and pipe means connected to said ports forming a flow path through said valve chamber, whereby said flow path is interrupted when said second port is blocked.

6. In a solenoid pilot valve assembly, a non-magnetic fluid enclosure defining an armature chamber and provided with a fluid inlet, a solenoid removably mounted on a wall of said enclosure and including a U-shaped core having a pair of pole faces abutting said wall, a pair of magnetic inserts incorporated in said wall and hermetically sealed thereto, said inserts providing a flux path between said pole faces and said armature chamber, an armature movably disposed within said chamber in operative relation to said inserts, a valve body having a stem operatively coupled to said armature, and a fluid path extending from said armature chamber through said valve body whereby the flow of fluid in said path is controlled by said solenoid.

7. In a solenoid pilot valve assembly, a non-magnetic enclosure defining an armature chamber and provided with a fluid inlet, an electromagnet removably mounted on the wall of said enclosure and including a U-shaped core having a pair of pole faces abutting said wall, said core being constituted by laminated material, a pair of magnetic inserts incorporated in said wall and hermetically sealed thereto, said inserts providing a flux path between said pole faces and said armature chamber, and an armature movably disposed within said chamber in operative relation to said insert whereby said armature is controllable by said electromagnet.

8. In a solenoid pilot valve assembly, a non-magnetic fluid enclosure defining an armature chamber and provided with a fluid inlet, a solenoid removably mounted on a wall of said enclosure and including a U-shaped core having a pair of pole faces abutting said wall, a pair of magnetic inserts incorporated in said wall and hermetically sealed thereto, said inserts providing a flux path between said pole faces and said armature chamber, an armature movably disposed within said chamber in operative relation to said inserts, a valve body having a stem operatively coupled to said armature, a fluid path extending from said armature chamber through said valve body whereby the flow of fluid in said path is controlled by said solenoid, a second like solenoid mounted on said enclosure at a position opposed to said first solenoid and including a core having a pole face, and a second insert magnetically coupling the pole face of the second solenoid to said armature whereby energization of said second solenoid provides a reverse valve action.

References Cited in the file of this patent

UNITED STATES PATENTS

| | | |
|---|---|---|
| 356,024 | Bain | Jan. 11, 1887 |
| 2,174,965 | Burdick | Oct. 3, 1939 |
| 2,294,693 | Ray | Sept. 1, 1942 |
| 2,394,103 | Rader | Feb. 5, 1946 |
| 2,398,452 | Shaw | Apr. 16, 1946 |
| 2,407,761 | McPherson | Sept. 17, 1946 |
| 2,459,883 | Kelley | Jan. 15, 1949 |
| 2,523,360 | Ellwood | Sept. 26, 1950 |
| 2,549,188 | Forsnas | Apr. 17, 1951 |
| 2,570,450 | Hottenroth | Oct. 9, 1951 |
| 2,573,369 | Snoddy | Oct. 30, 1951 |
| 2,585,711 | Whitney et al. | Feb. 12, 1952 |
| 2,617,444 | Gardner | Nov. 11, 1952 |
| 2,637,407 | Burk | May 5, 1953 |
| 2,680,354 | Gygax | June 8, 1954 |
| 2,699,655 | Garfield | Jan. 18, 1955 |
| 2,750,960 | Hansen | June 19, 1956 |
| 2,774,564 | Biggle | Dec. 18, 1956 |
| 2,800,614 | Thornberry | July 23, 1957 |